US009461724B1

(12) United States Patent
Schelstraete (10) Patent No.: US 9,461,724 B1
(45) Date of Patent: Oct. 4, 2016

(54) MATRIX PROCESSING ENGINE FOR MULTI-TONE MIMO SYSTEMS

(71) Applicant: Quantenna Communications, Inc., Fremont, CA (US)

(72) Inventor: Sigurd Schelstraete, Menlo Park, CA (US)

(73) Assignee: Quantenna Communications, Inc., Fremont, CA (US)

( * ) Notice: Subject to any disclaimer, the term of this patent is extended or adjusted under 35 U.S.C. 154(b) by 184 days.

(21) Appl. No.: 14/462,505

(22) Filed: Aug. 18, 2014

(51) Int. Cl.
*H04B 7/04* (2006.01)
*H04L 25/02* (2006.01)
*H04W 84/12* (2009.01)

(52) U.S. Cl.
CPC .......... *H04B 7/0456* (2013.01); *H04B 7/0452* (2013.01); *H04L 25/0204* (2013.01); *H04W 84/12* (2013.01)

(58) Field of Classification Search
None
See application file for complete search history.

(56) References Cited

U.S. PATENT DOCUMENTS

| 8,891,710 | B2* | 11/2014 | Roh | H04L 25/0204 |
| | | | | 375/229 |
| 2004/0095907 | A1* | 5/2004 | Agee | H04B 7/0417 |
| | | | | 370/334 |
| 2011/0142025 | A1* | 6/2011 | Agee | H04B 7/0413 |
| | | | | 370/342 |
| 2013/0315211 | A1* | 11/2013 | Balan | H04B 7/0697 |
| | | | | 370/336 |

* cited by examiner

*Primary Examiner* — Donald Mills
(74) *Attorney, Agent, or Firm* — IP Creators; Charles C Cary (57) ABSTRACT

A wireless transceiver apparatus including: a channel estimator, a discrete matrix transform module, a tone set controller, and a shared matrix transform module. The channel estimator determines a channel matrix for each tone on each communication link. The discrete matrix transform module derives a transform matrix for the communication link(s) on a selected base tone from the associated channel matrix determined by the channel estimator. The tone set controller initializes an estimation of the transform matrix, on a neighboring tone, with the transform matrix derived for the base tone. The shared matrix transform module iteratively estimates the transform matrix on a neighboring tone, from successive perturbations of the initial transform matrix derived for the base tone and the associated channel matrix for the neighboring tone; thereby reducing a number of iterations required to estimate the transform matrix on the neighboring tone.

12 Claims, 5 Drawing Sheets

Channel Inverse for Frequency Equalization of Received Signal

Shared Determination of Channel Inverse $H^{-1}$ for Neighboring Tones

FIG. 4B

Channel Inverse for Frequency Equalization of Received Signal

FIG. 5A Tx Precoding to Orthogonalize Transmissions

FIG. 6

FIG. 7  Sharing Matrix Transforms between Tones

MATRIX PROCESSING ENGINE FOR MULTI-TONE MIMO SYSTEMS

CROSS REFERENCE TO RELATED APPLICATION

This application claims the benefit of prior filed Provisional Application No. 61/867,564 filed on Aug. 19, 2013 entitled "Efficient Matrix Processing Engine for Multi-tone MIMO" which is incorporated herein by reference in its entirety as if fully set forth herein.

BACKGROUND OF THE INVENTION

1. Field of Invention

The field of the present invention relates in general to wireless local area networks (WLAN) including wireless access points (WAP) and stations and methods of matrix processing thereon.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless communication links to each 'client' device.

After selection of a single communication channel for the associated home network, access to the shared communication channel relies on a multiple access methodology identified as Collision Sense Multiple Access (CSMA). CSMA is a distributed random access methodology first introduced for home wired networks such as Ethernet for sharing a single communication medium, by having a contending communication link back off and retry access to the line if a collision is detected, i.e. if the wireless medium is in use.

Multiple-Input Multiple-Output (MIMO) equipped WAPs and stations have been gaining in popularity due to their ability to provide increased performance without the need to increase bandwidth and power. In a MIMO system, both transmitter and receiver have multiple antennas. This creates a matrix channel between the signals coming out of the transmit antennas and the signals observed at the receiver antennas. Where, as in a home or office, the environment has sufficiently rich signal scattering the MIMO system will support simultaneous independent data streams which increases throughput.

MIMO systems use Orthogonal Frequency Division Multiplexing (OFDM). OFDM divides the bandwidth of the signal into a relatively high number of orthogonal narrowband channels or "tones". The advantage is that channel estimation and equalization can be performed independently on each of the narrow-band channels. Since the channel for each tone is now a matrix, many of the channel operations that need to be performed now require matrix manipulation. These operations are most efficiently implemented in dedicated hardware, because they need to be performed very frequently and at high speed.

Communications on the single communication medium are identified as "simplex" meaning, communications from a single source node to one target node at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) MIMO capability of the WAP.

The IEEE 802.11ac standard also opened up new channel bandwidths, up to 160 MHz in a new Wi-Fi frequency range, i.e. 5 GHz. An IEEE 802.11 compliant wireless local area network (WLAN) utilizes many discrete contiguous narrow band sub-channels, sub-carriers or tones to support broadband communications on the selected communication channel. This scheme is referred to as orthogonal frequency-division multiplexing (OFDM). Each tone is independently modulated and requires considerable overhead in terms of processing and communication between transmitter and receiver to adequately set up and characterize one or more communication links thereon. An IEEE 802.11ac compliant WAP or station may, for example, be required to process up to 512 independent sub-carriers or tones at its full 160 MHz bandwidth.

Each revision of the IEEE 802.11 standard, offers enhanced capabilities and capacity. These capabilities come at a price in terms of increased overhead and processing capability.

What is needed are improved methods for managing processing of WLAN communications on individual tones/sub-carriers.

SUMMARY OF THE INVENTION

The present invention provides a method and apparatus for a wireless transceiver apparatus which supports communications on an IEEE 802.11 wireless local area network (WLAN) using shared matrix transforms.

In an embodiment of the invention a wireless transceiver apparatus is disclosed. The wireless transceiver apparatus may be a wireless access point (WAP) or a station. The wireless transceiver apparatus is configured to support at least one communication link with another of a plurality of transceiver nodes on orthogonal frequency-division multiplexed (OFDM) sub-carriers, a.k.a. tones of a selected communication channel of a wireless local area network (WLAN). In an embodiment of the invention the wireless transceiver apparatus includes: a channel estimator, a discrete matrix transform module, a tone set controller, and a shared matrix transform module. The channel estimator is configured to determine a channel matrix for each tone on the at least one communication link. The discrete matrix transform module couples to the channel estimator and is configured to derive a transform matrix for the at least one communication link on a selected base one of the tones, from the associated channel matrix determined by the channel estimator. The tone set controller couples to the discrete matrix transform module and is configured to initialize an estimation of the transform matrix for the at least one communication link on at least one neighboring tone, with the transform matrix derived for the selected base one of the tones. The shared matrix transform module couples to the tone set controller and is configured to iteratively estimate the transform matrix on the at least one neighboring tone, from successive perturbations of the initial transform matrix derived for the selected base one of the tones and the associated channel matrix for the at least one neighboring tone; thereby reducing a number of iterations required to estimate the transform matrix on the at least one neighboring tone.

The invention may be implemented in hardware, firmware or software.

Associated methods are also claimed.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION OF THE EMBODIMENTS

The present invention provides a method and apparatus for reducing overhead associated with processing WLAN communications on individual tones/sub-carriers via sharing of matrix transforms between tones. Matrix transforms are required for establishing each communication link on each tone. Typical transforms include: the inversion of a communication channel for frequency equalization of received communications; a singular value decomposition of a communication channel in response to an explicit channel sounding; and a precoding matrix determination for spatial mapping of a multi-user (MU) multiple-input multiple-output (MIMO) communication.

Figure 1:
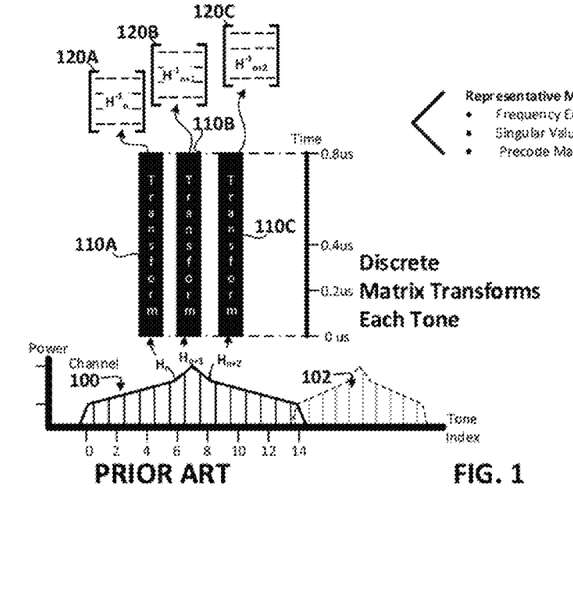
FIG. 1 is a combined graph showing the Prior Art approach to discrete processing of the matrix transforms associated with adjacent tones or sub-carriers of a Wireless Local Area Network (WLAN) on a wireless access point (WAP) or station.

FIG. 1 is a combined graph showing the Prior Art approach to discrete processing of the matrix transforms associated with adjacent tones or sub-carriers of a Wireless Local Area Network (WLAN) on a wireless access point (WAP) or station. The graph has a horizontal axis showing the index for contiguous tones/sub-carriers. On a first vertical axis the graph shows the power associated with each tone. On a second vertical axis the graph shows the relative processing time associated performing matrix transforms on each tone. Two Orthogonal Frequency Division Multiplexed (OFDM) communication channels 100, 102 are shown. Communications are conducted on a selected one of the communication channels, e.g. channel 100. Channel 100 includes a number of contiguous tones/sub-carriers each independently characterized and modulated. An IEEE 802.11ac 160 MHz channel has 512 independently modulated tones/sub-carriers. During an initial training phase the WAP and Stations characterize the transmit and receive communication channels "$H_n$" for each tone and further in the case of MU MIMO for each link on each tone, where the subscript "n" corresponds with the index number of the tone. Communication channels $H_n$, $H_{n+1}$, $H_{n+2}$ are shown for their associated tones. Once each tone's associated communication channel(s) are determined, one or more matrix transforms, 110A-C, are required before communications can commence. These matrix transforms are required for establishing each communication link on each tone. In the example shown, the matrix transforms 110A-C, result in discrete determinations of the channel inverses: $H_n^{-1}$, $H_{(n+1)}^{-1}$, $H_{(n+2)}^{-1}$ 120A-C respectively for each tone, e.g. tones n, n+1, n+1 in the channel 100. The WLAN node, e.g. WAP or station, receiving a communication, will need to perform a matrix transform on each tone to determine its channel inverse, with the resultant channel inverse matrix used to perform per tone frequency equalization of the received communications. Each transform for each tone requires the same relative amount of time since all transforms are preformed independently of one another in the prior art case. An IEEE 802.11 ac 160 MHz channel for example requires up to 512 discrete matrix transforms to determine the channel inverse for each tone.

Figure 2:
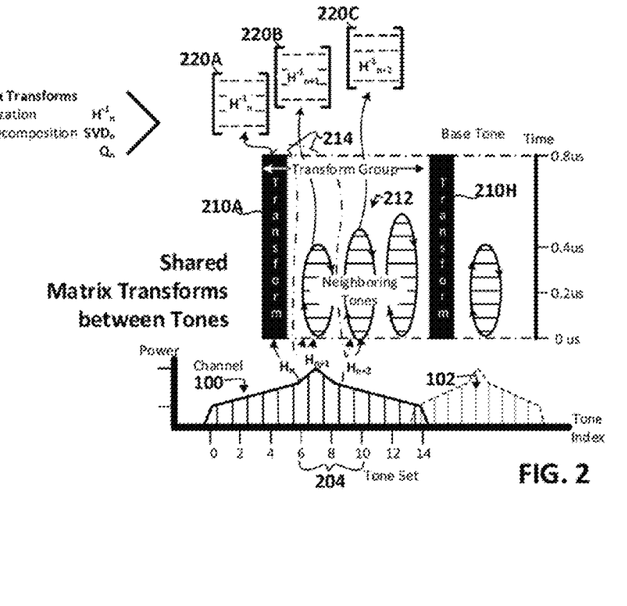
FIG. 2 is a combined graph showing shared processing of the matrix transforms associated with adjacent tones or sub-carriers of a Wireless Local Area Network (WLAN) in accordance with an embodiment of the invention.

FIG. 2 is a combined graph showing shared processing of the matrix transforms associated with adjacent tones or sub-carriers of a WLAN on a WAP or station in accordance with an embodiment of the invention. The graph has a horizontal axis showing the index for contiguous tones/sub-carriers. On a first vertical axis the graph shows the power associated with each tone. On a second vertical axis the graph shows the relative processing time associated performing matrix transforms on each tone. The OFDM communication channels 100, 102 are shown. Communications are conducted on a selected one of the communication channels, e.g. channel 100. Channel 100 includes a number of contiguous tones/sub-carriers each independently characterized and modulated. During an initial training phase the WAP and Stations characterize the transmit and receive communication channels "$H_n$" for each tone and further in the case of MU MIMO for each link on each tone, where the subscript "n" corresponds with the index number of the tone. Communication channels $H_n$, $H_{n+1}$, $H_{n+2}$ are shown for their associated tones. There is one communication channel for each tone, and further for each MU-MIMO link on a tone.

The current invention takes advantage of the similarity of the channel characteristics between adjacent tones to reduce the time required to perform matrix transforms thereon. The matrix solution to a prior matrix transform is used as the first estimate to the iterative determination of a solution for an adjacent tone. This means that the matrix operation will now converge to the final result in a lower number of steps. In the embodiment of the invention shown in FIG. 2, tones are split into sets, e.g. set 204, and within each set a single "base" tone is identified, with the remaining tones in the set identified as "neighboring" tones. Next a discrete matrix transform is performed on the base tone in each tone set to determine the required transform resultant for that tone, e.g.: a channel inverse "$H_n^{-1}$", a singular value decomposition "$SVD_n$," of the channel, or a precode matrix "$Q_n$," where more than one channel is supported per tone, i.e. MU-MIMO. A discrete matrix transform 210A is performed on the base tone of a first set of tones. A discrete matrix transform 210H is performed on the base tone of the next set of tones. The discrete matrix transform 210A on the base tone in the first set, results for example in the channel inverse 220A for that tone. The time required to obtain that result is substantially the same as the prior art approach shown in FIG. 1. The savings in processing time and overhead are realized on the matrix transforms 212 on the neighboring tones in the set. The transforms 212 for these neighboring tones are iterative and accept as input 214 the matrix transform result, e.g. channel inverse $H_n^{-1}$ 220A, from the base tone as an initial starting point. This greatly reduces the time and or processing cycles required to converge on the correct channel inverse results $H_{(n+1)}^{-1}$, $H_{(n+2)}^{-1}$ 220B, 220C respectively for the associated neighboring tones.

Figure 3:
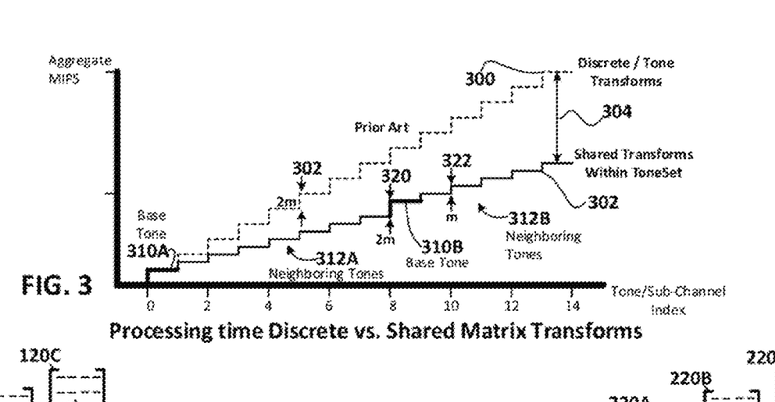
FIG. 3 is a graph comparing processing time or cycles associated with the Prior Art discrete processing of tones shown in FIG. 1, versus the shared processing between adjacent tones as shown in FIG. 2.

FIG. 3 is a graph comparing processing time or cycles associated with the Prior Art discrete processing of tones shown in FIG. 1, versus the shared processing between adjacent tones as shown in FIG. 2. On the horizontal axis the tone or sub-carrier index number is shown. On the vertical axis the aggregate number of instruction cycles, e.g. MIPS, is shown.

The dashed staircase line 300 corresponds to the cumulative processing of all tones in a communication channel using the prior art approach as shown in FIG. 1. In the prior art approach the steps on the staircase 300 all have uniform height 302, e.g. 2m where "m" is some number of processing instruction cycles required to perform the corresponding matrix transform discretely.

The solid staircase line 302 corresponds to the cumulative processing of all tones in a communication channel using the embodiment of the invention shown in FIG. 2. In that embodiment of the invention tones are split into sets with each set including a base tone and remaining neighboring tones, e.g. base tone 310A and neighboring tones 312A, or base tone 310B and neighboring tones 312B. The processing cycles 320 associated with discrete matrix transforms for base tones, e.g. tone 310B, are the same as the prior art case, e.g. 2m where "m" is some number of processing instruction cycles required to perform the corresponding matrix transform discretely. The savings in processing cycles, is evident in the height of the intermediate steps corresponding to the cycles required for shared matrix transforms on the neighboring tones. Shared matrix transforms on neighboring tones use the transform results from the base tones as an initial starting point for the transform, and thus require approximately half the processing cycles as their discrete prior art counterparts. The cumulative difference 304 in MIPS required to perform matrix transforms on all tones in a channel is reduced by approximately 50% as a result of the shared matrix transform methods in accordance with an embodiment of the invention shown in FIG. 2.

These reductions in matrix processing times are evident in either embodiments of the invention in which matrix processing is performed serially or in embodiments in which it is performed in parallel. In an embodiment of the invention in which matrices are processed serially, each tone set is processed sequentially and within each set the matrix transformation and solution for the base tone is used to initialize the iterative solution of the matrix transform for each neighboring tone successively. In another serial embodiment of the invention, the iterative matrix transform for each neighboring tone is initialized with the solution for the preceding neighboring tone. Thus, each neighboring tone in succession becomes after solution, the base tone for its own neighbor. With the matrix transform solution for the neighbor used to initialize the matrix transform for the next neighboring tone, and so forth. In an embodiment of the invention in which matrices are processed in parallel, each tone set is processed concurrently and within each set the processing of the base tone is followed by the concurrent processing of the neighboring tones.

Examples of matrix operations in which the current invention may be utilized are: matrix inversion, singular value decomposition (SVD), and diagonalization. Zero-forcing equalization essentially requires the inversion of the channel matrix to recover the transmitted data. Beamforming requires the receiver to provide feedback on the eigenmodes of the channel. This information can be obtained by performing an SVD on the channel matrix for every tone. Typically, the V-matrix of the SVD is conveyed back to the transmitter as input to the beamforming algorithm. Some forms of precoding in MU-MIMO may require the system to perform a diagonalization of the channel matrix.

Figure 4A:
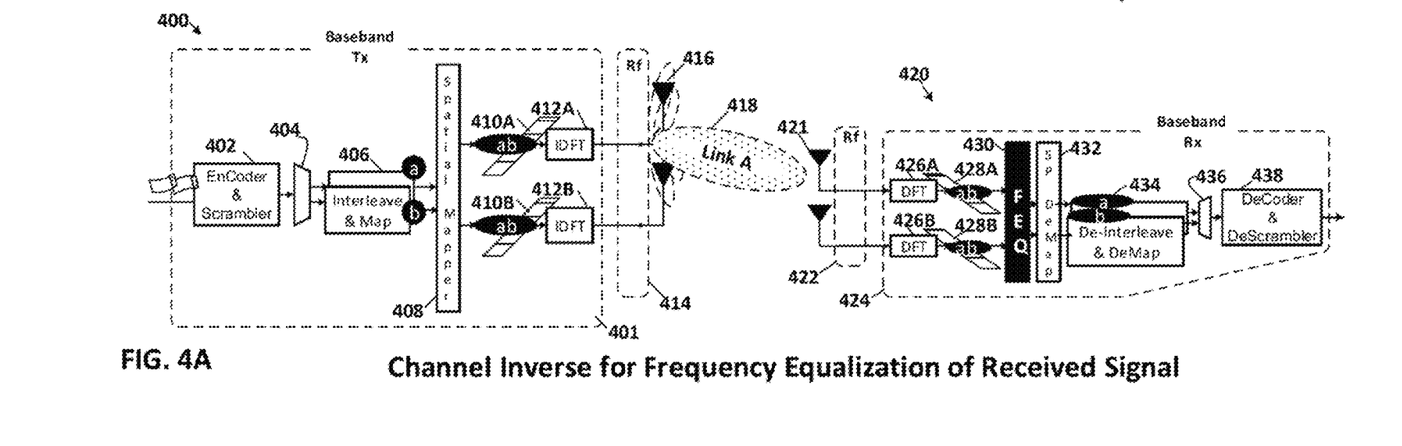
FIGS. 4A-B are a hardware block diagram and a processing block diagram respectively showing a shared determination of a channel inverse for adjacent tones in accordance with an embodiment of the current invention.
Figure 4B:
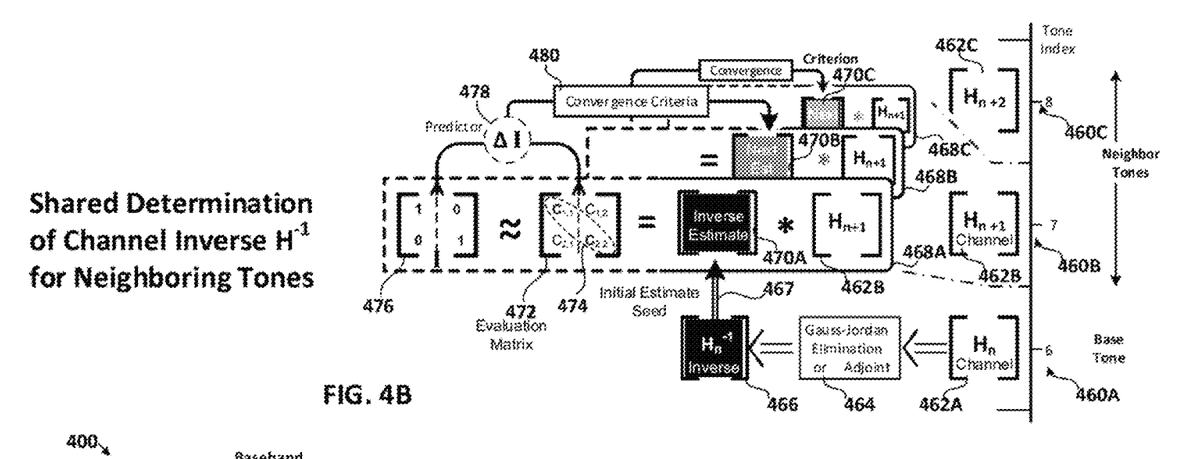

FIGS. 4A-B are a hardware block diagram and a processing block diagram respectively showing a shared determination of a channel inverse for adjacent tones in accordance with an embodiment of the current invention. FIG. 4A shows wireless transceiver node 400, e.g. a WAP or a station, transmitting multiple data streams "ab" to a single MIMO transceiver node 420. Transceiver 400 has a baseband section 401 and a radio frequency (RF) section 414, with 2 antenna 416. Transceiver 420 has a baseband section 424 and an RF section 422 which also has two antenna 421. In transceiver 400 communications for user/transceiver 420 are encoded and scrambled in encoder scrambler module 402 and de-multiplexed into two streams in demultiplexer 404. Each stream "a", "b" is subject to interleaving and constellation mapping in an associated interleaver mapper 406 and passed to the spatial mapper 408. The spatial mapper uses steering matrix to direct the signals from antennas 416 to the target transceiver 420. The spatially mapped streams are injected into all OFDM tones 410A-B of the two inverse discrete Fourier Transform (IDFT) modules 412A-B respectively for RF upconversion in RF stage 414 and for transmission by each of the transceiver's two antenna 416 over communication link 418 to transceiver 420.

The signals received at the two antenna 421 of transceiver 420 are downconverted in RF stage 422 and transformed from the time to the frequency domain in discrete Fourier Transform modules 426A-B. Next the individual tones in tone sets 428A-B are subject to frequency equalization (FEQ) in the FEQ 430. The FEQ uses the matrix inverse of the MIMO channel associated with link 418 to equalize the amplitude and phase of each tone independently of the frequency of each tone in a process known as frequency equalization. Next, the signals are spatially demapped in spatial demapper 432. Received streams "ab" are subject to de-interleaving and constellation demapping in associated deinterleaver demapper modules 434, followed by multiplexing in multiplexer 436. The received data "ab" is decoded and descrambling in decoder descrambler 438.

FIG. 4B a processing block diagram showing a shared determination of a channel inverse for adjacent tones in accordance with an embodiment of the current invention. A base tone 460A having a tone index number "6" and neighboring tones 460B-460C having indexes "7, 8" respectively are shown. Each tone has a corresponding channel matrix for each link, e.g. channel matrices 462A-C for the single communication link 418 supported by OFDM tones 460A-C respectively. Processing commences with the discrete determination of the inverse channel matrix 466 of the communication channel 462A for tone 460A. This may be accomplished by any iterative or non-iterative technique 464 such as Gauss-Jordan elimination or Adjoint. The channel inverse for the neighboring tones is determined using an iterative approach for each of the neighboring tones. The time or processing cycles required to determine the inverse channel matrix for the channel 462B for the neighboring tone 460B is reduced by initializing the first 468A of the iterative determinations 468A-C with a reasonable starting estimate 470A of the neighboring tone's inverse, e.g. the solution 466 from the base tone. The product 474 of the neighboring tone's channel 462B and its initial estimated channel inverse 470A is then determined. Ideally the product of a channel and its inverse is an identity matrix 476. The product matrix, in this case identified as the evaluation matrix 472 exhibits a degree of diagonalization 474 but is nevertheless not equivalent to the desired resultant, i.e. the identity matrix "I". The evaluation matrix 472 is compared to the identity matrix 476 and the difference "ΔI" between each coefficient of the identity matrix 476 and the corresponding coefficient in the product, a.k.a. evaluation matrix 474 is determined. The aggregate amount of these differences serves as a predictor 478 of the accuracy of the estimated channel inverse 470A. If the estimate is not accurate enough then another iteration 468B is required. In order for the next iteration to converge on a more accurate estimate of the channel inverse a convergence criteria 480 is required. In the case of the channel inverse a suitable convergence criteria is a re-estimation of the inverse channel matrix using the information obtained from the errors/differences in the preceding estimate. The re-estimate is obtained by subtracting from each coefficient of the identity matrix I the previously determined difference ΔI and multiplying the resultant matrix by the inverse channel matrix estimate $H^{-1}$ for the current iteration. This next channel matrix estimate 470B or $H_{next}^{-1}$ is thus equal to: (I-ΔI) $H_{current}^{-1}$. In each successive iteration 468B, 468C etc. the estimated inverse channel matrix 470B, 470C respectively is evaluated for accuracy. Once an accurate estimate of the inverse channel matrix has been determined, the processing of the next neighboring tone commences. In an embodiment of the invention the initial estimate of the channel inverse for the next neighboring tone, is the solution for the base tone. In an alternate embodiment of the invention the initial estimate of the channel inverse for the next neighboring tone is the solution from the prior neighboring tone and so forth. Once all the inverse channel matrices for all tones have been determined, they are used as inputs to the FEQ 430 by the receiving one of the transceivers 420 as discussed above in connection with FIG. 4A.

Figure 5A:
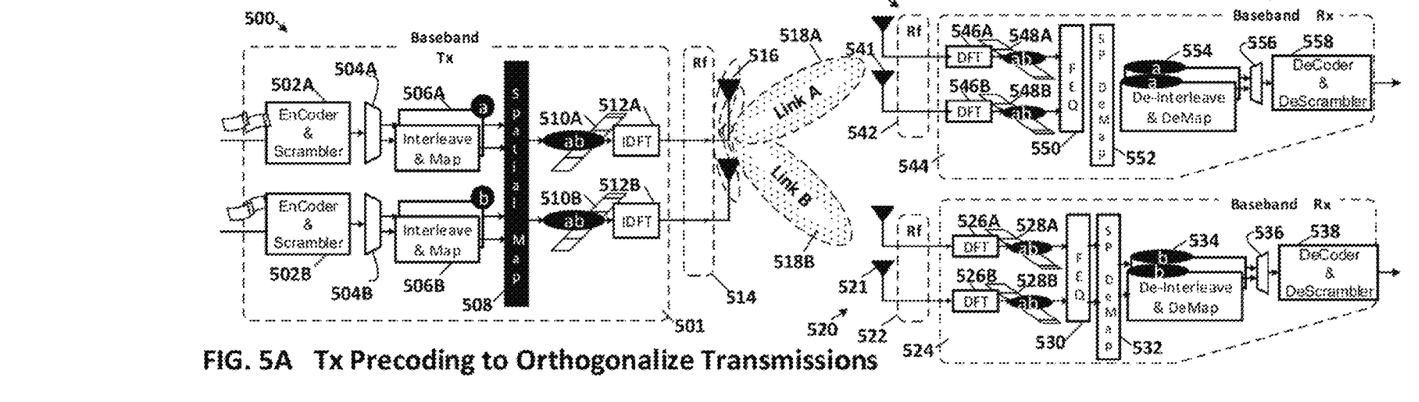
FIGS. 5A-B are a hardware block diagram and a processing block diagram respectively showing a shared determination of a precode matrix for adjacent tones in accordance with an embodiment of the current invention.
Figure 5B:
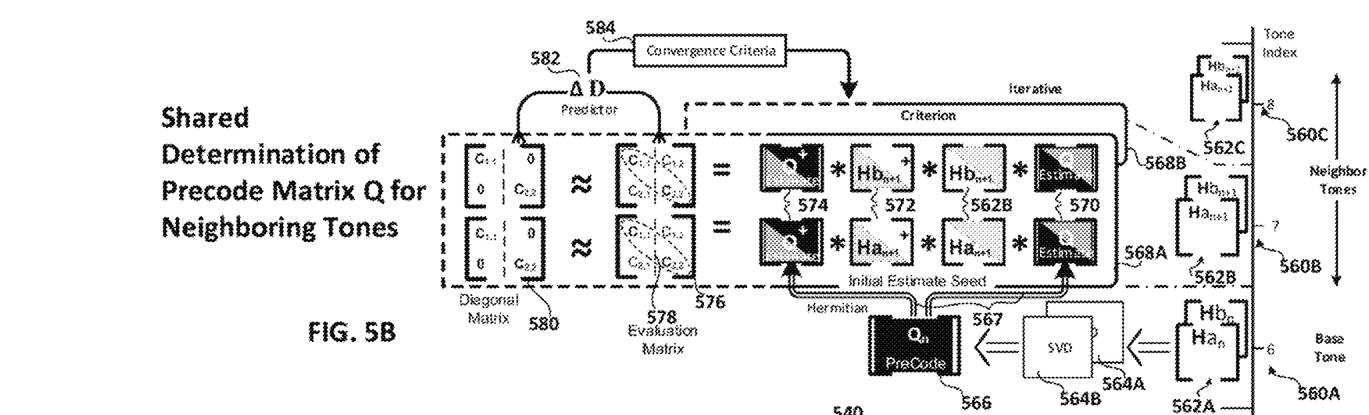

FIGS. 5A-B are a hardware block diagram and a processing block diagram respectively showing a shared determination of a precode matrix for adjacent tones in accordance with an embodiment of the current invention. FIG. 5A shows transceiver 500 with a baseband stage 501 and an RF stage 514 with two antennas 516 transmitting concurrently over two links 518A, 518B to a MU MIMO group comprising transceivers 520, 540 each with a pair of antenna 521, 541 respectively. In transceiver 500 communications for user/transceiver 540 are encoded and scrambled in encoder scrambler module 502A and de-multiplexed into two streams in demultiplexer 504A. Each stream "a" is subject to interleaving and constellation mapping in an associated interleaver mapper 506A and passed to the spatial mapper 508. Communications for user/transceiver 520 are encoded and scrambled in encoder scrambler module 502B and de-multiplexed into streams in demultiplexer 5046. Each stream "c" is subject to interleaving and constellation mapping in an associated interleaver mapper 506B and passed to the spatial mapper 508. The spatial mapper in this embodiment of the invention supports a precoding matrix to precode the two pairs of streams for each user so that they will arrive at their target stations antennas with identified interference from one another which will be removed by the associated equalizer during receive processing. The combined precoded streams are injected into all OFDM tones 510A-B of the two inverse discrete Fourier Transform (IDFT) modules 512A-B respectively for Radio Frequency (RF) upconversion in RF stage 514 and for transmission by each of the WAP's two antenna 516 over communication links 518A, 518B to transceivers 540, 510.

The signals received at the two antenna 521 of transceiver 520 exhibit known amounts of interference from the communications to station 540, which will be removed during the linear or non-linear equalization performed in FEQ 530. As a result in station 520 the received communications include contributions from both user's streams "ab" on each of the two antenna. These contributions/interference remain after downconversion in RF stage 522 and transformation from the time to the frequency domain in discrete Fourier Transform modules 526A-B from which these mixed streams are output as discrete OFDM tones/sub-carriers/sub-channels 528A-B each of which continues to exhibit such interference. All received streams are then subject to equalization in FEQ 530 implementing either linear or non-linear equalization which removes the cross user interference due to the precoding of the current invention. After spatial demapping 532 the received steam "b" are subject to de-interleaving and constellation demapping in associated deinterleaver demapper modules 534, followed by multiplexing in multiplexer 536. The received data "b" is decoded and descrambled in decoder descrambler 538.

The signals received at the two antenna 541 of transceiver 540 exhibit known amounts of interference from the communications to station 520, which will be removed during the linear or non-linear equalization performed in FEQ 530. As a result in station 540 the received communications include contributions from both user's streams "ab" on each of the two antenna. These contributions/interference remain after downconversion in RF stage 542 and transformation from the time to the frequency domain in discrete Fourier Transform modules 546A-B from which these mixed streams are output as discrete OFDM tones/su b-carriers/sub-channels 548A-B each of which continues to exhibit such interference. All received streams are then subject to equalization in FEQ 550 implementing either linear or non-linear equalization which removes the cross user interference due to the precoding of the current invention. After spatial demapping 552 the received steam "a" are subject to de-interleaving and constellation demapping in associated deinterleaver demapper modules 554, followed by multiplexing in multiplexer 556. The received data "a" is decoded and descrambled in decoder descrambler 558.

FIG. 5B is a processing block diagram showing a shared determination of a precode matrix for adjacent tones in accordance with an embodiment of the current invention. The precode matrix for each tone is used by transceiver 500 in the spatial mapper 508 to spatially map the two user streams "a & b" onto each antenna. A base tone 560A having a tone index number "6" and neighboring tones 560B-560C having indexes "7,8" respectively are shown. Each tone has a pair of corresponding channel matrices, i.e. one for each of the two links 518A-B, e.g. the pairs of channel matrices 562A-C for the pair of communication links 518A-B supported by the OFDM tones 560A-C respectively. Processing commences with the discrete determination of the precode matrix 566 of the pair of communication channels 562A for tone 560A. This may be accomplished by any iterative or non-iterative technique such as a Singular Value Decomposition (SVD) 564A-B.

After determining the precode matrix for the base tone, the precode matrix for each of the neighboring tones is determined using an iterative approach. The time or processing cycles required to determine the precode matrix for the pair of channels 562B for the neighboring tone 560B is reduced by initializing the first 568A of the iterative determinations 568A-B with a reasonable starting estimate 570 of the neighboring tone's precode matrix, e.g. the solution 566 from the base tone. This estimated precode matrix 570 and its conjugate transpose, a.k.a. Hermitian 574 are used as an initial estimate of the precode matrix for the neighboring tone. Two four factor products 578, a.k.a. evaluation matrices, are then determined, one for each of the channels $Ha_{n+1}$ and $Hb_{n+1}$. The four factor product for channel "a" comprises in order: the Hermitian of the estimated precode matrix $Q_{(n+1)}^+$; the Hermitian of the channel "a" matrix $Ha_{(n+1)}^+$; the estimated precode matrix $Q_{(n+1)}$; and the channel "a" matrix, $Ha_{(n+1)}$. The four factor product for channel "b" comprises in order: the Hermitian of the estimated precode matrix $Q_{(n+1)}^+$; the Hermitian of the channel "b" matrix $Hb_{(n+1)}^+$; the estimated precode matrix $Q_{(n+1)}$; and the channel "b" matrix, $Hb_{(n+1)}$.

When a proper precode matrix is found it will simultaneously block diagonalize both the resultant four factor products, a.k.a. evaluation matrices. Both evaluation matrices will exhibit strong diagonalization or block diagonalization: with non-zero coefficients on the diagonal and zeros elsewhere. In the first iteration 568A, each evaluation matrix exhibits a degree of diagonalization 578 but is nevertheless not equivalent to the desired resultant, i.e. a diagonal or block diagonal matrix "D". The evaluation matrices 578 are compared to the diagonal matrix "D" and the aggregate magnitude of the off-diagonal components is used as a predictor 582 of the accuracy of the estimated precode matrix 570. If the estimate is not accurate enough then another iteration 568B is required.

In order for the next iteration to converge on a more accurate estimate of the channel inverse a convergence criteria 584 is required. In the case of the precode matrix a suitable convergence criteria is a cost function for the non-diagonal coefficients expressed in terms of the contributions to their magnitude from both channels and the precode matrix. One such cost function is found in the following Equation 1:

$$C = \sum_{\substack{i,j \\ i \neq j}} |(Q^+ H_a^+ H_a Q)_{ij}|^2 + |(Q^+ H_b^+ H_b Q)_{ij}|^2$$

Equation 1
The solution to this equation for "C" can be approximated as a quadratic equation the minimum of which is used to choose the values for the precoding matrix on the subsequent iteration.

Figure 6:
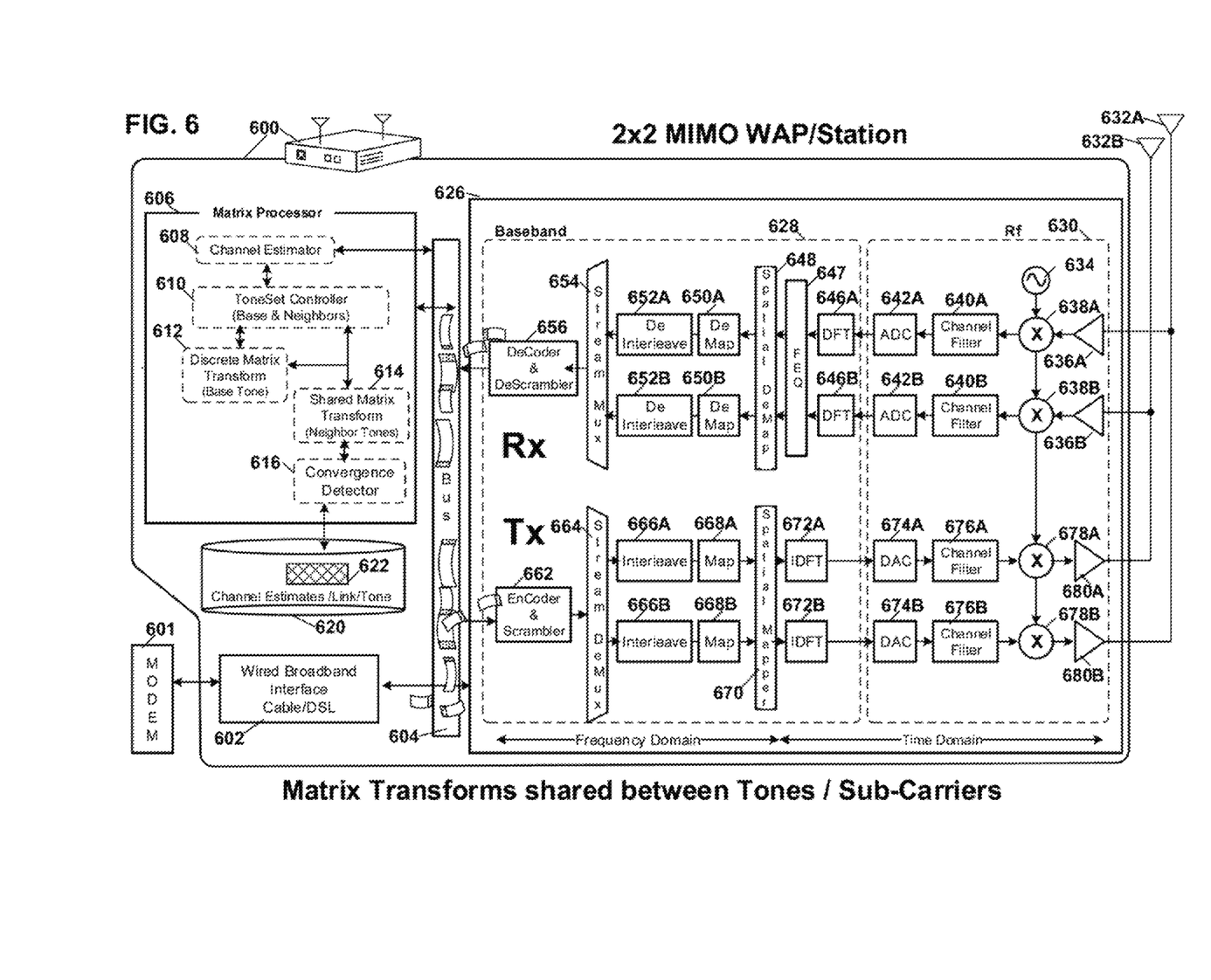
FIG. 6 is a hardware block diagram of a WLAN transceiver node supporting shared matrix transforms between tones in accordance with an embodiment of the invention.

FIG. 6 is a hardware block diagram of a WLAN transceiver node 600 supporting shared matrix transforms between tones in accordance with an embodiment of the invention. The transceiver node, e.g. station or WAP, is shown as supporting MIMO communications over 2 antenna each linked to two transmit and receive chains.

The MIMO transceiver receive path components include antennas 632A and 632B. The antennas are coupled to radio frequency (RF) module 630 and baseband module 628 of the WLAN stage 626, which implements in an embodiment of the invention the IEEE 802.11* standard for WLAN, with the '*' standing for the particular sub-standard, e.g. a, b, g, n, ac, ad, ax.

A first MIMO receive path originates with the antenna 632A, and includes: low noise amplifier (LNA) 636A, the tunable oscillator 634 and mixer 638A which down converts the received data channel, for filtration by the channel filter 640A, conversion in the analog-to-digital converter (ADC) 642A and domain conversion from the frequency to the time domain in the Discrete Fourier Transform (DFT) module 646A. The corresponding second MIMO receive path components are labeled with the "B" suffix.

In the baseband module 628 the complex coefficients for each sub-channel in each symbol interval are subject frequency equalization in FEQ 647 and spatial demapping in spatial demapper 648 followed by demapping in the associated one of demappers 650A-B. The resultant bits are deinterleaved in the associated one of deinterleavers 652A-B. Next the received data is multiplexed in stream multiplexer 654 and decoded and descrambled in the decoder and descrambler 656 which couples to the packet based bus 604.

The transmit path components in this embodiment of the invention are also shown. The data to be transmitted is encoded and scrambled in the encoder and scrambler 662. It is then demultiplexed into independent data paths one for each antenna in the stream demultiplexer 664. Next data is interleaved and mapped in the associated one of interleavers 666A-B and mappers 668A-B. Next the complex coefficients corresponding to the data are spatially mapped in the spatial mapper 670 using a selected beamforming matrix. Then the mapped coefficients of each sub-channel are transformed from the frequency domain to the time domain in the associated one of inverse discrete Fourier transform (IDFT) modules 672A-B.

Next, in the radio frequency module 630 the digital-to-analog (DAC) conversion is accomplished by the associated one of DACs 674A-B followed by filtration by the associated one of channel filters 676A-B. Next the filtered signals are upconverted in the associated one of upconverters 678A-B and amplified by the associated one of power amplifiers 680A-B each coupled to an associated one of antennas 632A-B for transmission to the receiving device. The device also includes a broadband interface 602 for interfacing with a digital signal line (DSL) or cable modem 600.

The transmit and receive paths operate under control of the matrix processor module 606. This module includes: a channel estimator 608, a tone set controller 610, a discrete matrix transform module 612, a shared matrix transform module 614, and a convergence detector 616. The matrix processor module couples to storage 620. The channel estimator 608 is configured to determine a channel matrix for each tone on the communication link. Where there is more than one communication link sharing the same tones as in the case of MU MIMO there will be an associated channel estimate for each link on each tone. The channel estimator in an embodiment of the invention is further configured to identify the channel matrix for the at least one communication link for the selected base ones of the tones and to interpolate the channel matrices for remaining neighboring ones of the tones from the channel matrices for the selected base ones of the tones. The channel estimator stores channel estimates for each link on each tone in table 622 in storage 620. The tone set controller 610 is coupled to the discrete matrix transform module and configured to initialize an estimation of the transform matrix for the communication link(s) on at least one neighboring tone, with the transform matrix derived for the selected base one of the tones. In an embodiment of the invention the tone set controller is further configured for identifying sets of tones contiguous in frequency to one another, and within each set the selected base tone and the at least one neighboring tone proximate in frequency with the base tone. The Discrete Matrix Transform module 612 is coupled to the channel estimator and configured to derive a transform matrix for the communication link(s) on a selected base one of the tones, from the associated channel matrix determined by the channel estimator. The shared matrix transform module 614 is coupled to the tone set controller and configured to iteratively estimate the transform matrix on the at least one neighboring tone, from successive perturbations of the initial transform matrix derived for the selected base one of the tones and the associated channel matrix for the at least one neighboring tone; thereby reducing a number of iterations required to estimate the transform matrix on the at least one neighboring tone. In another embodiment of the invention the shared matrix transform module is further configured to carry forward a transform matrix from a neighboring tone to initialize the transform matrix for the next neighboring tone. The convergence detector 616 is configured to detect when a matrix transform estimate from the shared matrix transform module has converged on an acceptable value.

Figure 7:
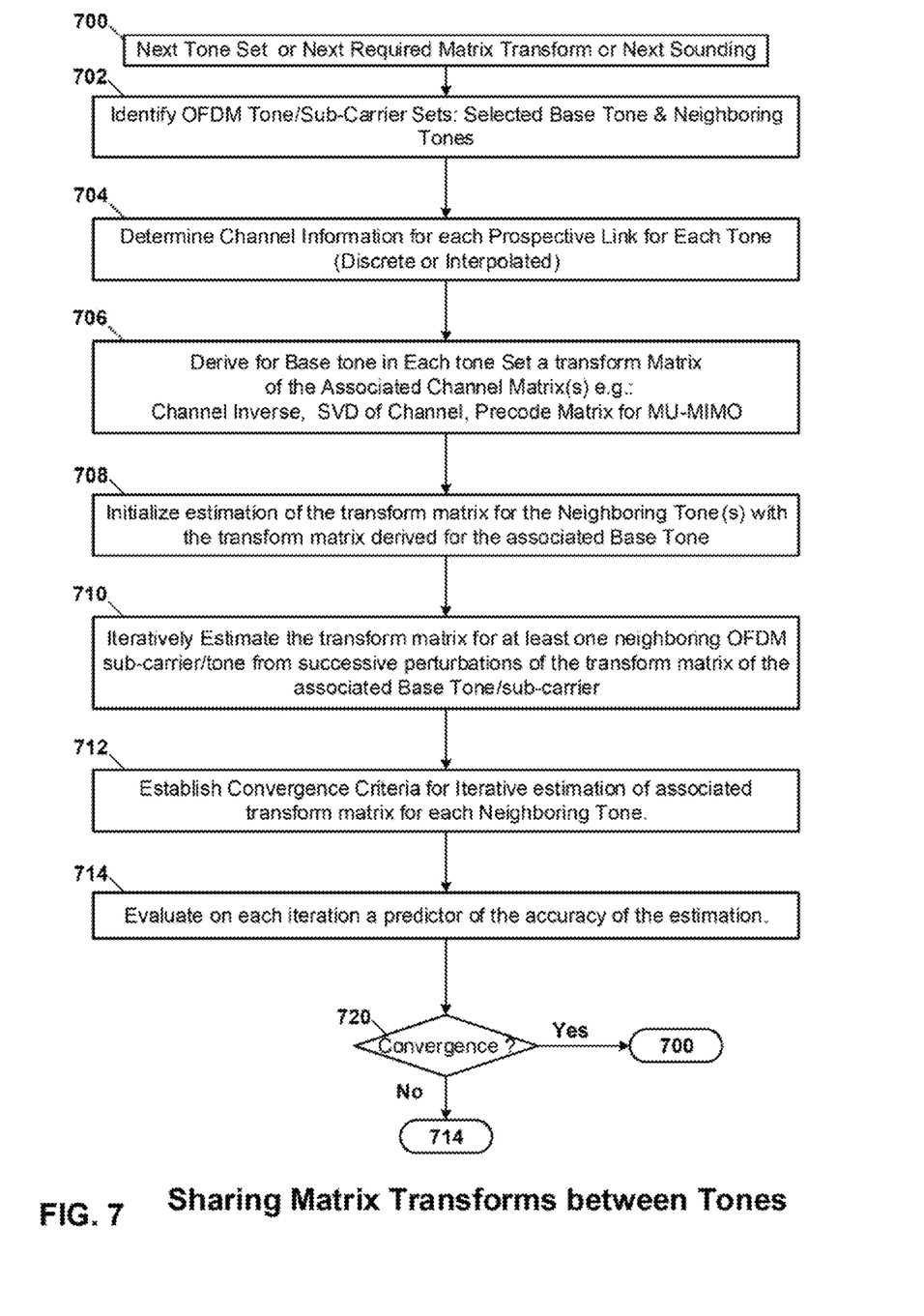
FIG. 7 is a process flow diagram of processes associated with a WLAN node supporting shared matrix transforms between tones in accordance with an embodiment of the invention.

FIG. 7 is a process flow diagram of processes associated with a WLAN node supporting shared matrix transforms between tones in accordance with an embodiment of the invention. Processing begins with the onset of the next tone set, or matrix transform, or channel sounding. Channel soundings, either explicit or implicit, are used to characterize or re-characterize the communication channel(s) between the network nodes. Control is then passed to process 702 in which OFDM tone or sub-carrier sets are identified, including the identification of base and neighboring tones. Next in process 704 channel information for each prospective communication link on each done is determined. In an embodiment of the invention an explicit sounding request and response for each tone may be exchanged between transmitting and receiving transceivers. In another embodiment of the invention explicit soundings are only conducted for interlaced ones of the tones with remaining tone's channel characteristics interpolated from the proximate interlaced ones of the tones. Control is then passed to process 706 in which the transform matrix: e.g. channel Inverse, SVD, or precode matrix, is derived discretely for the base tone in each set using the associated channel matrix(s) for that tone. Next in process 708 the processing of the neighboring tone is initialized with an estimation of the transform matrix for the neighboring tone derived from the associated base tone. Control is then passed to process 710. In process 710 the iterative estimation of the transform matrix for the at least one neighboring OFDM tone/sub-carrier from successive perturbations of the transform matrix of the associated base tone or sub-carrier is effected. In process 712 the convergence criteria for each iterative estimation of the associated transform matrix for each neighboring tone is established. In process 714, each iteration is evaluated with a predictor as to the accuracy of the current estimated matrix transform. Next in decision process 720 a determination is made as to whether the current estimated matrix transform has converged on a sufficiently accurate solution. If it has control is passed to process 700 for the next sounding or next required matrix transform or next tone set within the current matrix transform. If convergence has not been reached then control returns to process 714 for the evaluation of the next iteration of the matrix transform estimation and the evaluation of the accuracy thereof.

The components and processes disclosed herein may be implemented a software, hardware, firmware, or a combination thereof, without departing from the scope of the Claimed Invention.

The foregoing description of a preferred embodiment of the invention has been presented for purposes of illustration and description. It is not intended to be exhaustive or to limit the invention to the precise forms disclosed. Obviously many modifications and variations will be apparent to practitioners skilled in this art. It is intended that the scope of the invention be defined by the following claims and their equivalents.

What is claimed is:

1. A wireless access point (WAP) supporting wireless communications with associated stations on a selected communication channel of a wireless local area network (WLAN); and the WAP comprising:
  a plurality of antennas;
  a plurality of components coupled to one another to form a plurality of the transmit and receive paths each coupled to a corresponding one of the plurality of antennas for multiple-input multiple-output (MIMO) orthogonal frequency division multiplexed (OFDM) communications on the selected communication channel;
  a channel estimator coupled to the plurality of components and configured to explicitly sound each of at least two of the associated stations targeted for a multi-user (MU)-MIMO communication link and to determine from feedback received therefrom a channel matrix "H" to each of the targeted stations for corresponding ones of the OFDM tones;
  a tone set controller coupled to the channel estimator and configured to identify sets of the selected communication channel's OFDM tones and within each set a base and at least one neighboring tone proximate in frequency with the base tone;
  a discrete at transform module configured to derive as precode matrix for each base tone from the corresponding channel matrices for each base tone as determined by the channel estimator, for spatially mapping MU-MIMO transmissions to the at least two stations;
  a shared matrix transform module coupled to the discrete matrix transform module and configured to estimate a precode matrix for the at least one a neighboring tone, from the corresponding channel matrices for the at least one neighboring tone and the precede matrix for the base tone of the corresponding set of tones; thereby reducing an amount of time required for the estimation of each neighboring tone's precode matrix by the shared matrix transform module, relative to the amount of time required for the determination of the base tone's precode matrix by the discrete matrix transform module; and a spatial mapper component of the plurality of components for spatially mapping the MU-MIMO OFDM wireless transmissions utilizing the corresponding base tone precode matrix for the base tone in each set and the corresponding neighboring tone precode matrix for the at least one neighbor tone in each set.

2. The WAP of claim 1, further comprising:
the shared matrix transform module further configured to iteratively estimate the precede matrix for the at least one neighboring tone in each set, from successive perturbations of the precode matrix determined for the base tone in each set.

3. The WAP of claim 1, further comprising:
the channel estimator further configured to determine the channel matrices for the base tone in each set and to interpolate the channel matrices the at least one neighboring tone in each set from the channel matrices for the base tone in each set.

4. The WAP of claim 1, further comprising:
the shared matrix transform module further configured to iteratively estimate the corresponding precode matrix for each of the neighboring tones either serially or in parallel with respect to one another.

5. The WAP of claim 1, further comprising:
the shared matrix transform module further configured to carry forward an estimated precode matrix from a first neighboring tone to initialize an estimate of the precode matrix for the next neighboring tone.

6. The WAP of claim 1, further comprising:
the discrete matrix transform module further configured to derive a precode matrix for each base tone from a singular valued decomposition (SVD) of the corresponding channel matrices for each base tone as determined by the channel estimator.

7. A method for operating a wireless access point (WAP) having a plurality of antennas and supporting a multiple-input multiple-output (MIMO) wireless local area network (WLAN) associated stations on a selected one of a plurality of orthogonal frequency-division multiplexed (OFDM) communication channels; the method comprising the acts of:
explicitly sounding each of at least two of the associated stations targeted for a multi-user (MU)-MIMO communication link for feedback of the channel matrix "H" to each of the targeted stations for corresponding ones of the ODFM tones;
identifying sets of the selected communication channel's OFDM tones and within each set a base tone and at least one neighboring tone proximate in frequency with the base tone;
deriving for each base tone, a distinct precode matrix from the corresponding channel matrices for each base tone;
estimating for the at least one neighboring tone a distinct precode matrix from the corresponding channel matrices for the at least one neighboring tone, and the precode matrix the base tone of the corresponding set of tones; and
spatially mapping MU-MIMO OFDM wireless transmissions with the corresponding precode matrix for the base tone in each set derived in the deriving act and the corresponding precode matrix for the at least one neighboring tone in each set estimated in the estimating act.

8. The method for operating the WAP of claim 7, wherein the estimating act further comprises:
iteratively estimating the precode matrix for the at least one neighboring tone in each set, from successive perturbations of the preemie matrix for the base tone in each set.

9. The method for operating the WAP of claim 7, wherein the explicit sounding act further comprises:
determining the channel matrices for the selected base tone in each set; and
interpolating the channel matrices for the at least one neighboring tone in each set from the channel matrices for the base tone in each set determined in the determining act.

10. The method for operating the WAP of claim 7, wherein the at least one neighboring tone comprises a plurality of neighboring tones, and the estimating act further comprises one of the acts of:
estimating the corresponding precode matrix for each of the neighboring tones serially with respect to one another; and
iteratively estimating the corresponding precode matrix for each of the neighboring tones in parallel with respect to one another.

11. The method for operating the WAP of claim 7, wherein the estimating act further comprises:
carrying forward an estimated precode matrix from a first neighboring tone to initialize an estimate of the precode matrix for the next neighboring tone.

12. The method for operating the WAP of claim 7, wherein the deriving act further comprises:
deriving for each base tone, a distinct precode matrix from a singular valued decomposition (SVD) of the corresponding channel matrices for each base tone.

* * * * *